Oct. 1, 1946.  L. B. GREEN  2,408,627
APPARATUS FOR EXTRUDING
Filed Oct. 11, 1943

INVENTOR.
LEE B. GREEN
BY
Kwis Hudson Baughton & Williams
ATTORNEYS

Patented Oct. 1, 1946

2,408,627

UNITED STATES PATENT OFFICE 2,408,627

APPARATUS FOR EXTRUDING

Lee B. Green, Lakewood, Ohio

Application October 11, 1943, Serial No. 505,794

3 Claims. (Cl. 18—12)

This invention relates to the extrusion of non-metallic plastic material, and as one of its objects, aims to provide a novel means by which such plastic material can be extruded in a more rapid and satisfactory manner than previously.

Another object of my invention is to provide a novel means by which the output of existing extruding apparatus can be greatly increased at very little cost.

My invention further provides a novel extruding means for plastic material, involving the use of relatively rapid vibrations for accelerating the flow of the material through a die or orifice.

Still another object of my invention is to provide a novel means involving the use of flow-accelerating vibrations and which is especially valuable for extruding thin articles from non-metallic plastic material at a greatly increased rate for a given pressure applied to the plastic material.

Other objects and advantages will become apparent as the detailed description proceeds.

In the accompanying sheet of drawings—

Figure 2:
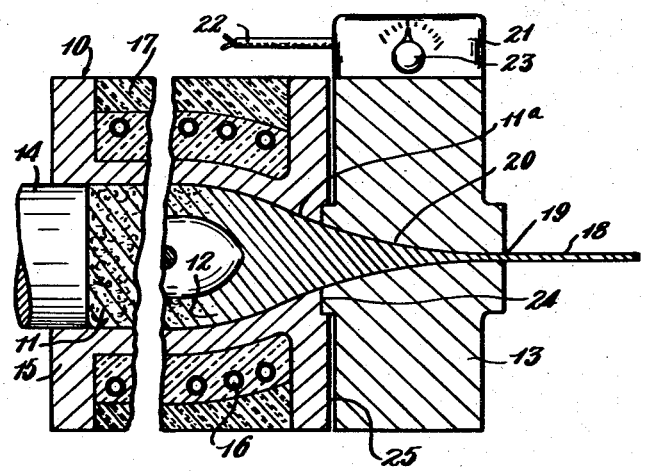
Fig. 2 is a partial longitudinal sectional view of such apparatus taken on line 2—2 of Fig. 1.
Figure 1:
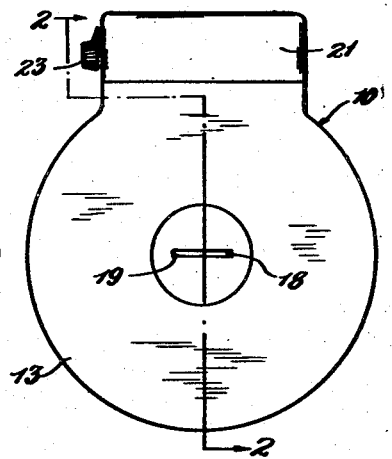
Fig. 1 is an end view of extruding apparatus embodying my invention.

Proceeding with a more detailed description of my invention reference will now be had to Figs. 1 and 2 in which I show a conventional form of extruding apparatus 10 embodying my novel vibratory feature. The apparatus 10 comprises a cylinder 11 adapted to contain non-metallic plastic or thermoplastic material 12 and a die head 13 for extruding or discharging such material to produce a desired product. A plunger 14 operable in the cylinder 11 subjects such material to pressure forcing the same through the reduced end 11a of the cylinder and through the extruding die 13. The cylinder 11 is contained in a body 15 which is suitably supported and forms a part of the extruding apparatus. A heating coil 16 is disposed around the cylinder 11 and supplies heat to the material 13. Thermal insulation 17 retards loss of heat from the cylinder.

The material 12 can be any non-metallic plastic material which is suitable for extrusion purposes including thermoplastic materials such as the material known as "tenite."

In extruding non-metallic plastic material to form relatively thin or thin-walled products considerable pressure must be applied to the material to obtain a satisfactory flow through the extruding die or orifice. The reason for this is that for the extrusion of such thin products the die has a corresponding relatively narrow orifice and the surface area of the product in relation to its cross-sectional area is great and results in a relatively increased amount of friction or adhesion between the die and the material being extruded. The heavy pressure required in the cylinder is needed to overcome such friction and adhesion.

My invention is applicable to various kinds of extruding apparatus and extruded products but is especially valuable in the extrusion of the above mentioned thin or thin-walled products because it greatly facilitates the flow of the plastic material through the extruding die. In Figs. 1 and 2 I have accordingly shown the extruded product 18 in the form of a relatively thin strip of plastic or thermoplastic material and have shown the die 13 as having an orifice or delivery opening 19 of a corresponding shape, that is to say, in the form of a relatively narrow slot. The die 13 also has a converging passage 20 therein, which forms a relatively smooth continuation of the reduced end 11a of the cylinder 11 and connects the latter with the orifice 19.

The above mentioned vibratory feature consists in imparting relatively rapid vibrations to the extruding apparatus 10 and preferably to the extruding die 13 thereof which is also sometimes referred to as the die head. These vibrations can be imparted through the extruding apparatus or die by any appropriate vibratory means or device such as the vibratory device 21 shown in this instance. The vibrator 21 may be an electric or electro-magnetic vibrator to which operating current may be supplied through the conductor cord 22. The vibratory device may be connected with the die 13 in any suitable manner, for example it may be mounted directly on the die at a suitable point thereof as shown in Figs. 1 and 2. This vibratory device may embody a means by which the rate and amplitude of the vibrations may be adjusted and which adjusting means is controlled or actuated from the exterior of the device by the knob 23.

The vibrations imparted to the extruding apparatus are preferably small, relative rapid blows or jars and result in a relatively great increase in the rate of flow of the plastic material from the orifice 19 for a given pressure applied to the material in the cylinder 11. In producing this accelerated flow the vibrations apparently serve the purpose of preventing the plastic material from adhering to the surfaces of the die and also in decreasing the friction which would otherwise retard the flow of material from the orifice. While I have mentioned the vibrations as being relatively rapid and as being preferably small or light blows or jars it should be understood that the invention contemplates a wide variation in the rate, amplitude and force of the vibrations, because these factors can obviously be varied to suit the requirements of the particular material being extruded, the characteristics of the die or orifice, and the shape or form of the product being produced.

As shown in Fig. 2 the vibrations are preferably applied to the extruding die 13 in a manner such that the vibrations will be more or less localized in or confined to the die or die head. To this end, the die 13 is connected with the member 15 so as to have only a relatively small area of contact therewith as represented by the projection 24. Other portions of the die 13 are isolated from the member 15 by the intervening space 25.

Figure 3:
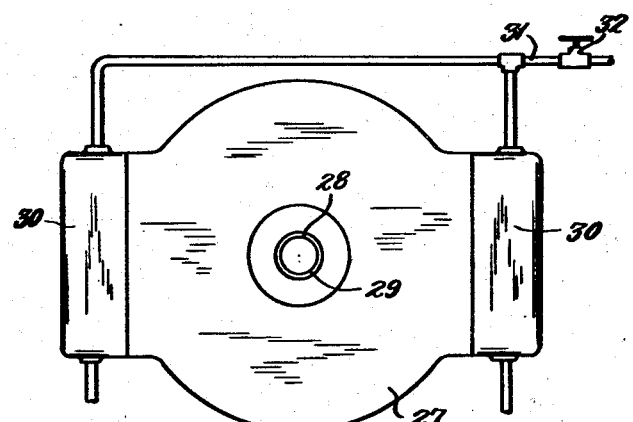
Fig. 3 is an end view of another form of my novel extruding apparatus.

In Fig. 3 I show another form of my novel extruding apparatus in which my vibratory feature is used in conjunction with an extrusion die 27 having an orifice 28 of a shape to produce an extruded product in the form of the thin-walled tube 29. In this modified form of my extrusion apparatus a plurality of vibrators 30 are mounted on the die 27 so as to be located on opposite sides of, or in spaced relation around, the orifice 28. The vibrators 30 are, in this instance, represented as being fluid actuated vibrators to which compressed air or other suitable motive fluid is supplied by the pipe 31. The operation of the vibrators 30 may be controlled by the valve 32 located in such pipe.

It will be understood, of course, that in accordance with my invention the vibrations are imparted to the die or extruding apparatus simultaneously with the carrying out of the extrusion operation, that is, simultaneous with the application of pressure to the plastic material 12 and also the application of heat when the material is a thermoplastic material. Likewise it will be understood that a plurality of vibrators could be applied to the die 13 as is suggested in Fig. 3 and, on the other hand, a single vibrator could be used with the die 27 of Fig. 3 as in the arrangement of Fig. 1.

Figure 4:
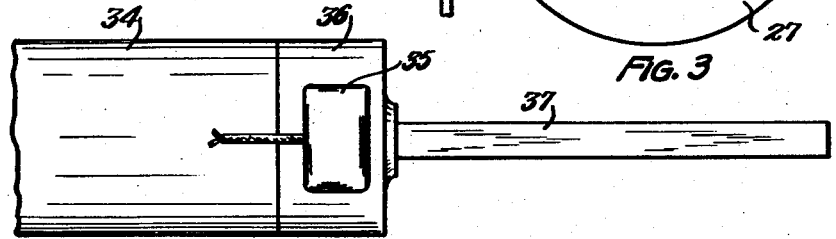
Fig. 4 and 5 are plan views, of a diagrammatic nature, showing comparative results obtained from extruding apparatus with and without the use of my vibratory feature.
Figure 5:
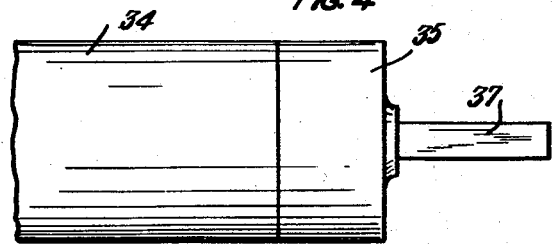

In Figs. 4 and 5, I have represented diagrammatically and in a visual manner the comparative results obtained from conventional extruding apparatus 34 when used with and without my vibratory feature. These views represent the same extruding apparatus using the same extruding die, thermoplastic material, and the same pressure and temperature values. Fig. 4 shows a vibrator 35 mounted on the die 36 of the apparatus and Fig. 5 shows the die 35 without having my vibratory feature applied thereto. Fig. 4 shows a relatively greater length of extruded product 37 being produced in a given time interval than in Fig. 5. These comparative views illustrate the accelerated flow of the plastic material which is obtained through the use of the vibratory feature of my invention, although it is not intended that the lengths of extruded product in Figs. 4 and 5 be scaled or otherwise compared by measurements of my patent drawing.

From the foregoing description and the accompanying drawing it will now be readily understood that I have provided a novel means by which non-metallic plastic or thermoplastic material can be extruded at a relatively accelerated rate and involving the use of vibrations imparted to the extruding apparatus for reducing the friction and adhesion in the extruding die or orifice. It will also be seen that my novel method and vibratory feature can be applied to extrusion apparatus during the initial construction thereof or can be applied to existing extrusion apparatus for greatly increasing the output thereof at relatively low cost.

While I have illustrated and described by extruding apparatus in considerable detail it will be understood, of course, that I do not wish to be correspondingly limited but regard my invention as including all changes and modifications coming within the scope of the appended claims.

Having thus described my invention, I claim:

1. In extruding apparatus, a die including a die head having an extrusion opening, means for discharging heated non-metallic thermoplastic material from said extrusion opening, and a vibration generating device attached to said die head.

2. In extruding apparatus, a die including a die head having a relatively narrow orifice, means for discharging non-metallic heated thermoplastic material through said orifice by applying a given pressure to said material, and means for accelerating the flow produced through said orifice by said given pressure comprising a vibrator attached to said die head.

3. In extruding apparatus, means for heating non-metallic thermoplastic material, means for subjecting the heated material to pressure, a die head having an extrusion opening for the delivery of said material therefrom in response to said pressure, said die head being connected with the apparatus so that the major portion of said die head is isolated from direct contact with said heating and pressure means, and a vibrating means attached to said die head and operable to impart vibrations to the latter for accelerating the flow of material through said extrusion opening.

LEE B. GREEN.